United States Patent
Kim et al.

(10) Patent No.: US 11,752,744 B2
(45) Date of Patent: Sep. 12, 2023

(54) MULTILAYER POLYIMIDE FILM AND METHOD FOR MANUFACTURING SAME

(71) Applicant: PI Advanced Materials Co., Ltd., Chungcheongbuk (KR)

(72) Inventors: Ki-Hoon Kim, Chungcheongbuk (KR); Kil-Nam Lee, Chungcheongbuk (KR)

(73) Assignee: PI Advanced Materials Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 17/641,879

(22) PCT Filed: Oct. 23, 2019

(86) PCT No.: PCT/KR2019/013956
§ 371 (c)(1),
(2) Date: Mar. 10, 2022

(87) PCT Pub. No.: WO2021/049707
PCT Pub. Date: Mar. 18, 2021

(65) Prior Publication Data
US 2022/0324213 A1    Oct. 13, 2022

(30) Foreign Application Priority Data

Sep. 11, 2019   (KR) .................. 10-2019-0112533

(51) Int. Cl.
| | |
|---|---|
| *B32B 27/28* | (2006.01) |
| *C08G 73/10* | (2006.01) |
| *B32B 15/08* | (2006.01) |
| *B32B 15/20* | (2006.01) |
| *B32B 27/08* | (2006.01) |
| *B32B 27/26* | (2006.01) |

(52) U.S. Cl.
CPC ............ *B32B 27/281* (2013.01); *B32B 15/08* (2013.01); *B32B 15/20* (2013.01); *B32B 27/08* (2013.01); *B32B 27/26* (2013.01); *C08G 73/1021* (2013.01); *C08G 73/1067* (2013.01); *B32B 2307/54* (2013.01); *B32B 2457/08* (2013.01)

(58) Field of Classification Search
CPC ....... B32B 27/281; B32B 15/08; B32B 15/20; B32B 27/08; B32B 27/26; B32B 2457/08; B32B 2307/54; B32B 27/18; B32B 2307/732; C08G 73/10; C08G 73/1021; C08G 73/1067
See application file for complete search history.

(56) References Cited

U.S. PATENT DOCUMENTS

| | | | |
|---|---|---|---|
| 2012/0028061 A1 * | 2/2012 | Matsumoto ........ | C08G 73/1046 427/372.2 |
| 2013/0256943 A1 * | 10/2013 | Matsutani .......... | C08G 73/1067 264/173.16 |

FOREIGN PATENT DOCUMENTS

| | | | |
|---|---|---|---|
| JP | 2007138058 | | 6/2007 |
| JP | 2012158149 | | 8/2012 |
| JP | 2012158149 A | * | 8/2012 |
| JP | 2013100379 | | 5/2013 |
| KR | 20070034007 | | 3/2007 |
| KR | 20120133807 | | 12/2012 |
| KR | 20130141628 | | 12/2013 |
| KR | 20140127377 | | 11/2014 |
| KR | 101773652 | | 9/2017 |
| KR | 20180104917 | | 9/2018 |
| KR | 6515180 | | 5/2019 |

* cited by examiner

*Primary Examiner* — John D Freeman
(74) *Attorney, Agent, or Firm* — Brooks, Cameron & Huebsch, PLLC

(57) ABSTRACT

The present disclosure provides a multilayer polyimide film in which the core layer is made of a non-thermoplastic polyimide resin comprising one or more imidization catalysts and one or more dehydrating agents, and the skin layer laminated on one or both surfaces of the core layer contains one or more imidization catalysts, but does not contain a dehydrating agent, and a method for manufacturing the same.

11 Claims, No Drawings

MULTILAYER POLYIMIDE FILM AND METHOD FOR MANUFACTURING SAME

TECHNICAL FIELD

The present disclosure relates to a multilayer polyimide film and a method for manufacturing the same, and more particularly, to a multilayer polyimide film which is excellent in interfacial adhesion between layers of the multilayer polyimide and adhesion to the copper foil, and has an elastic modulus of 7 GPa or more at the same time, and a method for manufacturing the multilayer polyimide film.

BACKGROUND ART

Polyimide (PI) is a polymer material with the highest levels of heat resistance, chemical resistance, electrical insulation, and weather resistance among organic materials based on an imide ring with very excellent chemical stability along with a rigid aromatic main chain.

In particular, due to excellent insulating properties, that is, excellent electrical properties such as low permittivity, it is in the spotlight as a high-functional polymer material in electrical, electronic, and optical fields.

In recent years, as electronic products become lighter and smaller, a thin circuit board that has a high degree of integration and is flexible is being actively developed.

There is a trend that such a thin circuit board having a structure in which a circuit including a metal foil is formed on a polyimide film that is easy to bend while having excellent heat resistance, low temperature resistance, and insulating properties is widely used.

As such a thin circuit board, a flexible metal clad laminate is mainly used, and as an example, a flexible copper clad laminate (FCCL) using a thin copper clad as a metal foil is included. In addition, polyimide is also used as a protective film, an insulating film, or the like for the thin circuit board.

A method for manufacturing a flexible metal clad laminate may include, for example, (i) a casting method in which polyamic acid, which is a precursor of polyimide, is cast or applied on a metal foil and then imidized, (ii) a metallizing method in which a metal layer is directly installed on a polyimide film by sputtering or plating, and (iii) a lamination method in which a polyimide film and a metal foil are bonded by heat and pressure through thermoplastic polyimide.

The lamination method among them has advantages in that the thickness range of the applicable metal foil is wider than that of the casting method, and the equipment cost is lower than that of the metallizing method.

However, in the case of the lamination method, since a thermoplastic resin is usually used for bonding the polyimide film and the metal foil, it is necessary to apply heat of 300° C. or higher to the polyimide film in order to express the thermal fusion properties of the thermoplastic resin.

There is a problem in that the storage modulus of the polyimide film is greatly lowered in this high-temperature lamination process. As the polyimide film loosens under the low storage modulus, after lamination is finished, there is a high possibility that the polyimide film does not exist in a flat form, dimensional stability is lowered, and a layer separation phenomenon in which each of the layers or metal foils is separated may occur in a multilayer polyimide film.

Meanwhile, even when the glass transition temperature of the polyimide film is remarkably low compared to the temperature of the lamination process, dimensional stability is lowered, and accordingly, there is an apprehension that the appearance quality of the polyimide film after lamination may deteriorate. Likewise, a layer separation phenomenon in which each of the layers or metal foils is separated may occur in a multilayer polyimide film.

Therefore, in order to solve the above problems and greatly improve processability, there is a need to develop a polyimide film which does not cause the layer separation phenomenon by having high interlayer interfacial adhesion and adhesion to the copper foil and can realize stable circuits by having excellent mechanical properties such as elastic modulus and the like, and an effective manufacturing method thereof.

Matters described in the above background art are intended to help the understanding of the background of the invention, and may include matters that are not the conventional art already known to those with ordinary skill in the art to which this technology belongs.

PRIOR ART DOCUMENTS

Patent Document (Patent Document 1) Korean Patent Publication No. 10-2012-0133807

DISCLOSURE

Technical Problem

Accordingly, in order to solve the above problems, an object of the present disclosure is to provide a multilayer polyimide film having excellent interlayer interfacial adhesion and adhesion to the copper foil and maintaining excellent mechanical properties (elastic modulus, etc.) at the same time, and a method for manufacturing the same.

Accordingly, it is a practical object of the present disclosure to provide specific embodiments thereof.

Technical Solution

An embodiment of the present disclosure for achieving the above object provides a multilayer polyimide film comprising a core layer containing non-thermoplastic polyimide, and a skin layer containing non-thermoplastic polyimide laminated on one or both surfaces of the core layer, wherein the core layer contains one or more dehydrating agents and one or more imidization catalysts, and the skin layer contains one or more imidization catalysts and does not contain a dehydrating agent.

The imidization catalyst of the skin layer of the multilayer polyimide film may be contained in an amount of more than 0.1% by mole and less than 1.2% by mole with respect to the solid content of a dianhydride component and a diamine component contained in the skin layer.

Further, the core layer and the skin layer may be obtained by imidizing a polyamic acid solution comprising one or more dianhydride components selected from the group consisting of pyromellitic dianhydride (PMDA), 3,3',4,4'-benzophenonetetracarboxylic dianhydride (BTDA), oxydiphthalic anhydride (ODPA), and 3,3',4,4'-biphenyltetracarboxylic dianhydride (BPDA), and one or more diamine components selected from the group consisting of 4,4'-diamino-2,2'-dimethylbiphenyl (m-tolidine), 3,5-diaminobenzoic acid (3,5-DABA), p-phenylenediamine (PPD), and 4,4'-oxydianiline (ODA).

The core layer and the skin layer of the multilayer polyimide film may have a thickness ratio of 6:4 to 9:1.

The imidization catalyst of the multilayer polyimide film may be one or more selected from the group consisting of quinoline, isoquinoline, β-picoline, pyridine, imidazole, 2-imidazole, 1,2-dimethylimidazole, 2-phenylimidazole, and benzimidazole, the dehydrating agent may be acetic anhydride, and the imidization catalysts contained in the core layer and the skin layer may be the same or different.

The multilayer polyimide film has an elastic modulus of 7 GPa or more, and the multilayer polyimide film and the copper foil have an adhesive force therebetween of 1.0 kgf/cm or more.

The multilayer polyimide film may be manufactured by a manufacturing method comprising the step of co-extruding a polyamic acid solution or a polyimide resin which forms the core layer and a polyamic acid solution or a polyimide resin which forms the skin layer.

Another embodiment of the present disclosure provides a manufacturing method comprising: a first solution preparation step of preparing a first solution comprising a first polyamic acid solution forming a core layer or a first polyimide resin prepared by imidizing the first polyamic acid solution, one or more imidization catalysts, and one or more dehydrating agents; a second solution preparation step of preparing a second solution which comprises a second polyamic acid solution forming a skin layer or a second polyimide resin prepared by imidizing the second polyamic acid solution, and one or more imidization catalysts, and does not comprise a dehydrating agent; a co-extrusion step of co-extruding the first solution and the second solution through a co-extrusion die; and a curing step of curing the first solution and the second solution that have passed through the co-extrusion process.

Advantageous Effects

As described above, the present disclosure can be usefully applied to various fields requiring these properties, in particular, electronic components such as flexible metal clad laminates, etc. by providing the multilayer polyimide film having excellent interlayer interfacial adhesion and adhesion to the copper foil and an excellent elastic modulus at the same time through a multilayer polyimide film in which the core layer is made of a non-thermoplastic polyimide resin comprising one or more imidization catalysts and one or more dehydrating agents, and the skin layer laminated on one or both surfaces of the core layer contains one or more imidization catalysts, but does not contain a dehydrating agent, and a method for manufacturing the same.

BEST MODE

Hereinafter, embodiments of the present disclosure will be described in more detail in the order of "a multilayer polyimide film" according to the present disclosure and "a method for manufacturing the multilayer polyimide film".

Prior to this, the terms or words used in the present specification and claims should not be construed as being limited to their ordinary or dictionary meanings, and the inventor should interpret them as meaning and concept consistent with the technical spirit of the present disclosure based on the principle that the concepts of the terms can be appropriately defined in order to explain his own invention in the best possible way.

Accordingly, since the configuration of the embodiments described in the present specification is only one of the most preferred embodiments of the present disclosure and does not represent all of the technical spirit of the present disclosure, it should be understood that various equivalents and modified examples that may be substituted for them may exist at the time of filing the present disclosure.

In the present specification, the singular expression includes the plural expression unless the context clearly dictates otherwise. In the present specification, it should be understood that terms such as "comprise", "provided with" or "have" are intended to designate the presence of an embodied feature, number, step, constituent element, or a combination thereof, but they do not preclude the possibility of the presence or addition of one or more other features or numbers, steps, constituent elements, or combinations thereof.

In the present specification, when an amount, concentration, or other value or parameter is given as an enumeration of a range, preferred range, or preferred upper values and preferred lower values, it is to be understood that all ranges formed of any pair of any upper range limit value or preferred value and any lower range limit value or preferred value are specifically disclosed, regardless of whether ranges are separately disclosed.

When a range of numerical values is mentioned in the present specification, the range is intended to include the endpoints and all integers and fractions within the range, unless otherwise stated. It is intended that the scope of the present disclosure not be limited to the particular values mentioned when defining the ranges.

In the present specification, "dianhydride" is intended to include precursors or derivatives thereof, and they may not technically be dianhydride, but will nevertheless react with a diamine to form a polyamic acid, and the polyamic acid may be converted into polyimide again.

The multilayer polyimide film according to the present disclosure comprises a core layer containing a non-thermoplastic polyimide, and a skin layer containing a non-thermoplastic polyimide laminated on one or both surfaces of the core layer, wherein the core layer contains one or more dehydrating agents and one or more imidization catalysts, and the skin layer contains one or more imidization catalysts and does not contain a dehydrating agent.

The non-thermoplastic polyimide is polyimide other than a thermoplastic polyimide, and the multilayer polyimide film of the present disclosure consists only of the non-thermoplastic polyimide.

The dianhydride component used to form the non-thermoplastic polyimide may include one or more selected from the group consisting of pyromellitic dianhydride (PMDA), 3,3',4,4'-benzophenonetetracarboxylic dianhydride (BTDA), oxydiphthalic anhydride (ODPA), and 3,3',4,4'-biphenyltetracarboxylic dianhydride (BPDA), but the present disclosure is not limited thereto, The diamine component may include one or more selected from the group consisting of 4,4'-diamino-2,2'-dimethylbiphenyl (m-tolidine), 3,5-diaminobenzoic acid (3,5-DABA). p-phenylenediamine (PPD), and 4,4'-oxydianiline (ODA), but the present disclosure is not limited thereto.

The non-thermoplastic polyimide resins of the core layer and the skin layer may be the same or different. That is, the dianhydride component and the diamine component of the polyimide resins forming the core layer and the skin layer may be respectively the same or different, and even if the same dianhydride component and diamine component are used, the composition ratios of the respective components may be different.

Further, the skin layer may be laminated on one or both surfaces of the core layer, and in particular, it is preferably laminated on both surfaces of the core layer to form a multilayer polyimide film composed of three layers.

The skin layer on one or both surfaces of the core layer may also be formed in a multilayer of one or more layers.

The core layer and the skin layer may have a thickness ratio of preferably 6:4 to 9:1, but the present disclosure is not limited thereto. When the thickness of the core layer is less than 6 parts or exceeds 9 parts, the dielectric loss value may be increased, and when the thickness of the skin layer is less than 1 part or exceeds 4 parts, the adhesive force characteristics may be reduced.

Both the core layer and the skin layer of the present disclosure contain an imidization catalyst. Further, the core layer contains a dehydrating agent, but the skin layer does not contain a dehydrating agent.

Examples of the imidization catalyst may include aliphatic tertiary amines, aromatic tertiary amines, heterocyclic tertiary amines, etc., and any component may be used as long as it has an effect of accelerating the dehydrating ring closure action of the dehydrating agent.

In particular, the imidization catalyst may be preferably one or more selected from the group consisting of quinoline, isoquinoline, β-picoline, pyridine, imidazole, 2-imidazole, 1,2-dimethylimidazole, 2-phenylimidazole, and benzimidazole, more preferably one or more of isoquinoline and β-picoline.

The dehydrating agent serves as a dehydrating ring closure agent for polyamic acid, and may include compounds such as aliphatic acid anhydrides, aromatic acid anhydrides, N,N'-dialkyl carbodiimides, lower aliphatic halides, halogenated lower aliphatic acid anhydrides, arylsulfonic acid dihalides, thionyl halides, etc.

These compounds may be used alone, and may also be used by appropriately combining two or more thereof.

Among them, it is preferable to use aliphatic acid anhydrides, aromatic acid anhydrides, etc., and it is more preferable to use acetic anhydride, but the present disclosure is not limited thereto.

The core layer may contain 1.5 to 4% by mole of the dehydrating agent with respect to the solid content of the dianhydride component and the diamine component contained in the core layer.

Here, the imidization catalysts contained in the core layer and the skin layer may be each contained in an amount of more than 0.1% by mole and less than 1.2% by mole with respect to the solid content of the dianhydride component and the diamine component contained in the core layer and the skin layer.

The contents of the imidization catalysts of the core layer and the skin layer may be adjusted to be the same as or different from each other in order to control the imidization rate of the core layer and the skin layer within the above content range.

For example, when the contents of the imidization catalysts in the core layer and the skin layer are adjusted to be different, the content of the imidization catalyst contained in the core layer may be greater or less than the content of the imidization catalyst contained in the skin layer.

Preferably, in order to control the imidization rate of the skin layer, the imidization catalyst contained in the skin layer may be contained in an amount of 0.2 to 1.1% by mole with respect to the solid content of the dianhydride component and the diamine component contained in the skin layer, more preferably 0.4 to 1.0% by mole.

In a multilayer polyimide film comprising a core layer and a skin layer laminated on the core layer, when the imidization catalyst is injected only into the core layer, the interfacial close adhesion properties between the core layer and the skin layer are lowered so that there has been a problem in that the multilayer polyimide film is divided into separate layers to result in deterioration of the film properties.

Further, when the skin layer contains the imidization catalyst in an amount of 0.1% by mole or less, the interlayer interfacial adhesion and the adhesion to the copper foil are low so that it is not only unsuitable for application to products, but also has a very lowered elastic modulus.

When the skin layer contains 1.2% by mole of the catalyst, it is difficult to control the imidization rate so that the skin layer on the core layer is not properly formed.

In this regard, when the imidization rate of the core layer and the skin layer is controlled by containing an appropriate amount of the imidization catalyst in both the core layer and the skin layer, it not only can improve the interfacial close adhesion between the skin layer and the core layer, but also can improve the adhesive force between the multilayer polyimide film and the copper foil, and an excellent elastic modulus can be maintained. In particular, it is preferable that the imidization of the core layer and the skin layer proceeds at a similar rate.

That is, when the dehydrating agent and the imidization catalyst are less than the above ranges, the chemical imidization is insufficient, and the multilayer polyimide film is broken or the mechanical strength thereof is lowered during the calcination.

Further, when these amounts are more than the above ranges, the imidization proceeds rapidly, and casting into a film form becomes difficult.

The imidization catalysts used in the core layer and the skin layer may be the same as or different from each other, and preferably the same imidization catalysts may be used, but the present disclosure is not limited thereto.

The multilayer polyimide film in which the core layer and the skin layer contain an appropriately controlled amount of the imidization catalyst, and only the core layer contains the dehydrating agent has an elastic modulus of 7 GPa or more, and the adhesive force between the multilayer polyimide film and the copper foil is 1.0 kgf/cm$^2$ or more.

The multilayer polyimide film may have an elastic modulus of 7 GPa or more, preferably 7.5 GPa or more, and more preferably 8 GPa or more.

Further, the adhesive force between the multilayer polyimide film and the copper foil may be 1.0 kgf/cm$^2$ or more, preferably 1.5 kgf/cm$^2$ or more.

Other functional layers may be laminated on the skin layer of the manufactured multilayer polyimide film depending on the intended use, and in particular, a thermoplastic polyimide (TPI) resin layer, metal foil, etc. may be further laminated, but the present disclosure is not limited thereto.

Although the metal foil to be used is not particularly limited, when the flexible metal clad laminate of the present disclosure is used for electronic devices or electrical devices, it may be, for example, metal foils including copper or copper alloy, stainless steel or its alloy, nickel or nickel alloy (42 alloy is also included), and aluminum or an aluminum alloy.

The manufactured multilayer polyimide film may have a metal foil (especially, a copper foil) laminated thereon through a casting method, a metallizing method, a lamination method, or the like to manufacture a flexible metal clad laminate.

In particular, an excellent elastic modulus and excellent adhesion to a metal foil (especially copper foil) of the multilayer polyimide film of the present disclosure is advantageous in the manufacture of a flexible metal clad laminate (especially, a flexible copper clad laminate), and contribute to the expression of excellent properties of the manufactured flexible metal clad laminate.

The multilayer polyimide film of the present disclosure may be manufactured through the step of co-extruding a polyamic acid solution or polyimide resin forming the core layer and a polyamic acid solution or polyimide resin forming the skin layer.

That is, it may be manufactured by a manufacturing method comprising: a first solution preparation step of preparing a first solution comprising a first polyamic acid solution forming the core layer or a first polyimide resin prepared by imidizing the first polyamic acid solution, one or more imidization catalysts, and one or more dehydrating agents; a second solution preparation step of preparing a second solution which comprises a second polyamic acid solution forming the skin layer or a second polyimide resin prepared by imidizing the second polyamic acid solution, and one or more imidization catalysts, and does not comprise a dehydrating agent; a co-extrusion step of co-extruding the first solution and the second solution through a co-extrusion die; and a curing step of curing the first solution and the second solution that have passed through the co-extrusion process.

Specifically, in order to manufacture the multilayer polyimide film of the present disclosure, the manufacturing method may be proceeded by comprising a first filling step of filling a first storage tank with the first solution that is the first polyamic acid solution or the first polyimide resin prepared by imidizing the first polyamic acid solution, a second filling step of filling a second storage tank with the second solution that is the second polyamic acid solution or the second polyimide resin prepared by imidizing the second polyamic acid solution, a co-extrusion step of co-extruding the first solution and the second solution through a co-extrusion die in which a first flow path that is connected to the first storage tank and a second flow path and a third flow path that are respectively connected to the second storage tank are respectively formed, and a curing step of curing the first solution and the second solution that have passed through the co-extrusion process.

Meanwhile, when using the first polyamic acid solution as the first solution and using the second polyamic acid solution as the second solution, it is preferable that the manufacturing method is proceeded by further comprising an imidization step of imidizing the first solution and the second solution that have passed through the co-extrusion process prior to the curing step.

Although the polyamic acid solution is not particularly limited, the solid content is usually obtained at a concentration of 5 to 35% by weight, preferably 10 to 30% by weight, but when the concentration is in this range, the polyamic acid solution obtains appropriate molecular weight and solution viscosity.

A solvent for synthesizing the polyamic acid solution is not particularly limited, and any solvent may be used as long as it dissolves the polyamic acid. Specifically, the solvent may be an organic polar solvent, and specifically, it may be an aprotic polar solvent, preferably an amide-based solvent. For example, it may be one or more selected from the group consisting of N,N'-dimethylformamide (DMF), N,N'-dimethylacetamide, N-methyl-pyrrolidone (NMP), gamma-butyrolactone (GBL), and diethylene glycol dimethyl ether (diglyme), but the present disclosure is not limited thereto, and they may be used alone or in combination of two or more thereof as needed. In one example, N,N-dimethylformamide and N,N-dimethylacetamide may be preferably used as the solvent.

In the preparation step of the polyamic acid, all the monomers may be added at once, or the respective monomers may be sequentially added, depending on the types of monomers and the desired physical properties of the polyimide film. In this case, partial polymerization between the monomers may occur.

Further, when preparing the polyamic acid solution, a filler may be added for the purpose of improving various properties of the film such as sliding properties, thermal conductivity, conductivity, corona resistance, loop hardness, etc.

A filler to be added is not particularly limited, but preferred examples thereof may include silica, titanium oxide, alumina, silicon nitride, boron nitride, calcium hydrogen phosphate, calcium phosphate, mica, etc.

The particle diameter of the filler is not particularly limited, and may be determined depending on the film properties to be modified and the types of fillers to be added.

In general, the filler may have an average particle diameter of 0.05 to 100 μm, preferably 0.1 to 75 μm, more preferably 0.1 to 50 μm, and particularly preferably 0.1 to 25 μm.

When the particle diameter is less than this range, it becomes difficult to exhibit the modifying effect, and when the particle diameter is more than this range, there may be a case that the surface properties are greatly impaired, or the mechanical properties are greatly reduced.

Further, the addition amount of the filler is not particularly limited also, and it may be determined by the film properties to be modified, the particle diameter of the filler, or the like.

In general, the filler may be added in an amount of 0.01 to 100 parts by weight, preferably 0.01 to 90 parts by weight, and more preferably 0.02 to 80 parts by weight with respect to 100 parts by weight of polyimide.

When the filler is added in an amount less than this range, it is difficult to exhibit the modifying effect by the filler, and when the filler is added in an amount more than this range, there is a possibility that the mechanical properties of the film may be greatly impaired.

The method of adding a filler is not particularly limited, and any well-known method may also be used.

The multilayer polyimide film of the present disclosure comprising an imidization catalyst and a dehydrating agent may mainly have a chemical imidization method or a complex imidization method applied thereto, but the present disclosure is not limited thereto.

As an example of the chemical imidization method, a gel, which is an intermediate having self-supporting properties, is formed by performing heat treatment in a temperature range of 40 to 300° C., preferably 80 to 200° C. and more preferably 100 to 180° C. to activate the dehydrating agent and imidization catalyst, thereby partially performing curing and/or drying. Thereafter, it is preferable to include a process of peeling the gel from the support and a process of further heating the gel to imidize and dry the remaining amic acid (hereinafter, also referred to as a "calcination process").

As an example of the complex imidization method, a polyimide resin may be obtained by injecting a dehydrating agent and an imidization catalyst into a polyamic acid solution, heating the mixture at 80 to 200° C., preferably 100 to 180° C. to partially cure and dry the heated mixture, and heating the partially cured and dried mixture at 200 to 400° C. for 5 to 400 seconds.

Hereinafter, the present disclosure will be described in more detail using Manufacturing Example, Comparative Examples, and Examples. The following Manufacturing Example, Comparative Examples, and Examples are for illustrative purposes of the present disclosure, and the scope of the present disclosure is not limited thereto.

Manufacturing Example: Manufacturing of Multilayer Polyimide Film

As a core layer varnish, polyamic acid with a solid content of 18.5% was prepared by reacting pyromellitic dianhydride (PMDA) and 4,4'-oxydianiline (ODA) as a dianhydride component and a diamine component respectively at a ratio of 1:1 in a DMF solvent.

Thereafter, 1.5 to 4% by mole of acetic anhydride (dehydrating agent) and 0.1 to 1% by mole of isoquinoline (imidization catalyst) were supplied through a mixer with respect to the solid content of the core layer varnish, and the core layer varnish with a final solid content of 12.3% by weight was discharged to a multilayer die.

A mixed catalyst (comprising acetic anhydride as a dehydrating agent and isoquinoline or β-picoline as an imidization catalyst) was supplied in a proportion of 50% by weight of the core layer varnish, and the core layer varnish with a final solid content of 12.3% by weight was discharged to a multilayer die.

After preparing polyamic acid using the same monomer as in the core layer varnish, isoquinoline whose content was adjusted with an imidization catalyst was mixed with DMF (however, in the case of the skin layer varnish, a dehydrating agent was not contained) to also prepare a skin layer varnish with the same final solid content of 12.3% by weight as in the core layer varnish, and the skin layer varnish was supplied into the multilayer die to finally manufacture a three-layered multilayer polyimide film having a skin/core/skin structure through co-extrusion.

Comparative Examples and Examples

The multilayer polyimide films were prepared according to the above-described Manufacturing Example, but the contents of the imidization catalysts in the skin layers of the multilayer polyimide films were adjusted as shown in Table 1 below to measure the elastic modulus values and adhesive force values of the multilayer polyimide films.

In the case of the core layer, 2.7% by mole of acetic anhydride (dehydrating agent) and 0.4% by mole of isoquinoline (imidization catalyst) were used with respect to the solid content of the core layer varnish.

The elastic modulus values of the multilayer polyimide films of the present disclosure were measured in accordance with ASTM D882.

In order to measure the adhesive force values between the multilayer polyimide films of the present disclosure and the copper foil, after placing Innoflex (1 mil, Epoxy type, Innox product) on a flexible metal clad laminate having a copper foil laminated on both surfaces thereof, placing a PVC film and a protective PI film on both surfaces thereof, and raising the temperature to 160° C., thermocompression bonding was performed at a pressure of 10 Kgf/cm² for 30 minutes. After cutting the films to a width of 13 mm, a 180° peel test was performed.

TABLE 1

| Classification | Content of the imidization catalyst in the skin layer (mol %) | Elastic modulus (GPa) | Adhesive force with the copper foil (kgf/cm²) |
| --- | --- | --- | --- |
| Example 1 | 0.4 | 7.64 | 1.5 |
| Example 2 | 0.5 | 7.95 | 1.5 |
| Example 3 | 0.7 | 8.11 | 1.5 |
| Example 4 | 1.0 | 8.92 | 1.5 |
| Comparative Example 1 | 0 | 3.57 | Layer separation |
| Comparative Example 2 | 0.1 | 3.75 | 0.2~0.3 |
| Comparative Example 3 | 1.2 | — | Unable to form a film |
| Comparative Example 4 | 1.5 | — | Unable to form a film |

When the imidization catalyst contents of the skin layers corresponded to 0.4 to 1.0% by mole with respect to the solid contents of the dianhydride component and the diamine component contained in the skin layers (Examples 1 to 4), the adhesive force values with the copper foil were maintained to 1.5 kgf/cm², and the elastic modulus values of the multilayer polyimide films were measured to be 7.64 to 8.92 GPa. As the contents of the imidization catalysts in the skin layers increased, the elastic modulus values also showed a tendency to improve.

Meanwhile, when the imidization catalyst was not contained in the skin layer at all (Comparative Example 1), a layer separation phenomenon in which the core layer and the skin layer were separated occurred during the measurement of adhesive force with the copper foil, and the elastic modulus also was 3.57 GPa, which was very low compared to Examples in which appropriate amounts of the imidization catalysts were contained in the skin layers.

Further, when 0.1% by mole of the imidization catalyst was contained in the skin layer (Comparative Example 2), the adhesive force with the copper foil was 0.2 to 0.3 kgf/cm², which was very low compared to Examples in which appropriate amounts of the imidization catalysts were contained in the skin layers, and the elastic modulus (3.75 GPa) was also partially improved compared to Comparative Example 1, but was at a very low level.

In the cases of Comparative Example 3 (1.2% by mole) and Comparative Example 4 (1.5% by mole) in which the imidization catalysts were used in excessive amounts in the skin layers, since it was difficult to control the imidization rate of the skin layers, the film formation was not performed properly so that the multilayer polyimide films were not formed properly, and the formed polyimide films had very poor appearance so that they could not be applied as products.

Although the embodiments of the present disclosure have been described above through the detailed description of the present disclosure, it will be possible for those with ordinary skill in the art to which the present disclosure pertains to make various applications and modifications within the scope of the present disclosure based on the above contents.

The invention claimed is:

1. A multilayer polyimide film comprising:
   a core layer containing non-thermoplastic polyimide; and
   a skin layer containing non-thermoplastic polyimide laminated on one or both surfaces of the core layer,
   wherein the core layer contains one or more dehydrating agents and one or more imidization catalysts, and the skin layer contains one or more imidization catalysts and does not contain a dehydrating agent;

wherein the imidization catalyst of the skin layer is contained in an amount of more than 0.1% by mole and less than 1.2% by mole with respect to the solid content of a dianhydride component and a diamine component contained in the skin layer; and wherein the multilayer polyimide film has an elastic modulus of 7 GPa or more, and the multilayer polyimide film and a copper foil have an adhesive force therebetween of 1.0 kgf/cm$^2$ or more.

2. The multilayer polyimide film of claim 1, wherein the core layer and the skin layer are obtained by imidizing a polyamic acid solution comprising one or more dianhydride components selected from the group consisting of pyromellitic dianhydride (PMDA), 3,3',4,4'-benzophenonetetracarboxylic dianhydride (BTDA), oxydiphthalic anhydride (ODPA), and 3,3',4,4'-biphenyltetracarboxylic dianhydride (BPDA), and one or more diamine components selected from the group consisting of 4,4'-diamino-2,2'-dimethylbiphenyl (m-tolidine), 3,5-diaminobenzoic acid (3,5-DABA), p-phenylenediamine (PPD), and 4,4'-oxydianiline (ODA).

3. The multilayer polyimide film of claim 1, wherein the core layer and the skin layer have a thickness ratio of 6:4 to 9:1.

4. The multilayer polyimide film of claim 1, wherein the imidization catalyst is one or more selected from the group consisting of quinoline, isoquinoline, β-picoline, pyridine, imidazole, 2-imidazole, 1,2-dimethylimidazole, 2-phenylimidazole, and benzimidazole.

5. The multilayer polyimide film of claim 1, wherein the dehydrating agent is acetic anhydride.

6. The multilayer polyimide film of claim 1, wherein the imidization catalysts contained in the core layer and the skin layer are the same or different.

7. The multilayer polyimide film of claim 1, wherein the multilayer polyimide film is manufactured by a manufacturing method comprising the step of co-extruding a polyamic acid solution or a polyimide resin which forms the core layer and a polyamic acid solution or a polyimide resin which forms the skin layer.

8. A method for manufacturing a multilayer polyimide film, the method comprising:

a first solution preparation step of preparing a first solution comprising a first polyamic acid solution forming a core layer or a first polyimide resin prepared by imidizing the first polyamic acid solution, one or more imidization catalysts, and one or more dehydrating agents;

a second solution preparation step of preparing a second solution which comprises a second polyamic acid solution forming a skin layer or a second polyimide resin prepared by imidizing the second polyamic acid solution, and one or more imidization catalysts, and does not comprise a dehydrating agent;

a co-extrusion step of co-extruding the first solution and the second solution through a co-extrusion die; and a curing step of curing the first solution and the second solution that have passed through the co-extrusion process, wherein the core layer and the skin layer are non-thermoplastic polyimide, wherein the imidization catalyst of the skin layer is contained in an amount of more than 0.1% by mole and less than 1.2% by mole with respect to the solid content of a dianhydride component and a diamine component contained in the skin layer;

wherein the multilayer polyimide film comprises the skin layer laminated on both surfaces of the core layer; and wherein the multilayer polyimide film has an elastic modulus of 7 GPa or more, and the multilayer polyimide film and a copper foil have an adhesive force therebetween of 1.0 kgf/cm$^2$ or more.

9. The method of claim 8, further comprising an imidization step of imidizing the first solution and the second solution that have passed through the co-extrusion process prior to the curing step when using the first polyamic acid solution as the first solution and using the second polyamic acid solution as the second solution.

10. The method of claim 8, wherein the first polyamic acid solution and the second polyamic acid solution comprise one or more dianhydride components selected from the group consisting of pyromellitic dianhydride (PMDA), 3,3',4,4'-benzophenonetetracarboxylic dianhydride (BTDA), oxydiphthalic anhydride (ODPA), and 3,3',4,4'-biphenyltetracarboxylic dianhydride (BPDA), and one or more diamine components selected from the group consisting of 4,4'-diamino-2,2'-dimethylbiphenyl (m-tolidine), 3,5-diaminobenzoic acid (3,5-DABA), p-phenylenediamine (PPD), and 4,4'-oxydianiline (ODA).

11. The method of claim 8, wherein the imidization catalyst is one or more selected from the group consisting of quinoline, isoquinoline, β-picoline, pyridine, imidazole, 2-imidazole, 1,2-dimethylimidazole, 2-phenylimidazole, and benzimidazole, and the dehydrating agent is acetic anhydride.

\* \* \* \* \*